UNITED STATES PATENT OFFICE.

EUGEN ANDERWERT AND HERMANN FRITZSCHE, OF BASEL, SWITZERLAND, ASSIGNORS TO SOCIETY OF CHEMICAL INDUSTRY IN BASLE, OF BASEL, SWITZERLAND.

SUBSTANTIVE ORTHOOXYAZODYESTUFFS.

1,338,414.     Specification of Letters Patent.     Patented Apr. 27, 1920.

No Drawing.     Application filed June 11, 1919. Serial No. 303,309.

*To all whom it may concern:*

Be it known that we, EUGEN ANDERWERT and HERMANN FRITZSCHE, chemists, both citizens of the Swiss Republic, and residents of Basel, Switzerland, have invented new and useful Substantive Orthooxyazodyestuffs, of which the following is a full, clear, and exact specification.

We have found that the azodyestuffs, which contain one molecule of the diazoderivative of an orthoaminooxyaryl-sulfonamid-compound corresponding to the formula

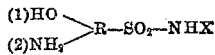

(wherein R stands for an aryl-radical which may be further substituted and X for hydrogen or an aryl radical) and one molecule of a 2:5:7-aminonaphtholsulfonic compound corresponding to the formula

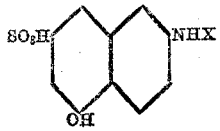

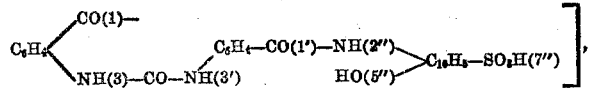

are substantive dyestuffs dyeing directly unmordanted cotton. When derived from a 2:5:7-aminonaphtholsulfonic compound, which is able to combine with two diazo groups, these dyestuffs can be prepared by combining one molecule of the said 2:5:7-aminonaphtol-sulfonic compounds with two molecules of the diazoderivative of the said ortho-amino-oxy-arylsulfonamid-compounds or with one molecule of this latter and one molecule of another aromatic orthooxydiazo-compound.

The new dyestuffs constitute in a dry state brown powders dissolving in dilute acids with red to violet colorations in dilute alkalis with claret-red to blue-violet colorations and in concentrated sulfuric acid with red to violet colorations, dye unmordanted cotton direct tints sensitive to acids and to alkalis and give by their treatment with coppering agents on the fiber copper compounds of claret-red to blue-violet pure shades fast to alkalis and to acids and extraordinarily fast to light.

The invention is illustrated by the following examples:

*Example 1.*

15.5 parts of 2-amino-6-nitro-1-oxybenzene-4-sulfonamid (sodium salt) are dissolved in about 100 parts of water and diazotized at 0–5° C. by means of 35 parts of hydrochloric acid of 30 per cent. and 6.9 parts of sodium nitrite. After a stirring of ¼ of an hour the diazoderivative is added, while stirring, to a solution of 31.5 parts of 2-phenylamino-3-oxynaphthalene-7-sulfonic acid and of 40 parts of sodium carbonate in 200 parts of water, cooled down to about 10° C. The combination achieved, the dyestuff is precipitated from the hot solution, filtered off and dried. It constitutes, in a dry state, a dark-brown powder, dissolves in dilute alkalis to violet solutions, in dilute acid to claret-red solutions and in concentrated sulfuric acid to red solutions and dyes unmordanted cotton direct tints sensitive to alkalis and acids turning, on subsequent coppering, to a clear blue-violet fast to alkalis and acids and extraordinarily fast to light.

*Example II.*

37.6 parts of 2-amino-1-oxybenzene-4-sulfonamid are dissolved in 200 parts of water and 50 parts of hydrochloric acid of 30 per cent. and to the solution thus obtained is added a concentrated aqueous solution of 13.8 parts of sodium nitrite. The diazosolution quickly formed is added, while stirring, to a solution of 46.1 parts of 5:5'-dioxy-2:2'-dinaphthylamin-7:7'-disulfonic acid and of 60 parts of sodium carbonate in 200 parts of water and the dyestuff is isolated in the usual manner. It constitutes, in a dry state, a reddish-brown powder, dissolves in dilute alkalis to blue-violet solutions, in dilute acids to violet solutions and in concentrated sulfuric acid to violet solutions and dyes unmordanted cotton direct tints sensitive to alkalis and to acids and turning, on subsequent coppering, to a clear violet fast to alkalis and to acids and extraordinarily fast to light.

*Example III.*

The diazosolution prepared according to Example 2 from 37.6 parts of 2-amino-1-oxy-benzene-4-sulfonamid is added to a solution of 50.4 parts of symmetrical 7:7'-disulfo-5:5'-dioxy-2:2'-dinaphthylurea and of 60 parts of sodium carbonate in 400 parts of water. The dyestuff is isolated in the usual manner. It constitutes, in a dry state, a dark brown powder, dissolves in dilute alkalis to claret solutions, in dilute acids to red solutions and in concentrated sulfuric acid to red solutions and dyes unmordanted cotton direct tints sensitive to alkalis and acids and turning, on subsequent coppering, to a clear claret fast to alkalis and to acids and extraordinarily fast to light.

*Example IV.*

53 parts of 2-amino-1-oxybenzene-4-sulfonanilid are dissolved in 50 parts of hydrochloric acid of 30 per cent. and about 300 parts of water and to the solution thus obtained is added, at about 0° to 5° C. an aqueous solution of 13.8 parts of sodium nitrite. The diazoderivative separated in the form of yellow flocks, is added, at about 10° C. and while stirring, to a solution of 50.4 parts of symmetrical 7:7'-disulfo-5:5'-dioxy-2:2'-dinaphthylurea and of 60 parts of sodium in about 200 parts of water. The combination achieved, the dyestuff is salted out, filtered off and dried. It constitutes in a dry state a dark-brown powder, dissolves in dilute alkalis to claret solutions, in dilute acids to red solutions and dyes unmordanted cotton direct tints sensitive to alkalis and to acids and turning, on subsequent coppering, to a clear claret fast to acids and to alkalis and extraordinarily fast to light.

*Example V.*

The diazosolution prepared according to Example 2 from 18.8 parts of 2-amino-1-oxy-benezene-4-sulfonamid is added to a solution of 46.1 parts of 5:5'-dioxy-2:2'-dinaphthylamin-7:7'-disulfonic acid and of 60 parts of sodium carbonate in 200 parts of water, cooled down to 10° C. After a short time, is added the diazosolution derived from 18.9 parts of 2-amino-1-oxybenzene-4-sulfonic acid. After stirring for 12 hours, the dyestuff is salted out from the solution, filtered off and dried. It constitutes in a dry state, a reddish-brown powder, dissolves in dilute alkalis to blue-violet solutions, in dilute acids to violet solutions and in concentrated sulfuric acid to violet solutions and dyes unmordanted cotton direct shades sensitive to alkalis and to acids, turning, on subsequent coppering, to a clear violet fast to alkalis and to acid and extraordinarily fast to light.

What we claim is:

1. As new products the herein described substantive orthooxyazodyestuffs derived from the diazoderivative of an orthoamino-oxyarylsulfonamid compound corresponding to the formula

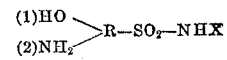

(wherein R stands for an aryl radical which may be further substituted and X for hydrogen or an aryl radical) from a 2:5:7-aminonaphtholsulfonic compound corresponding to the formula

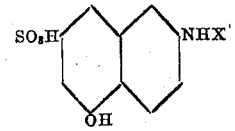

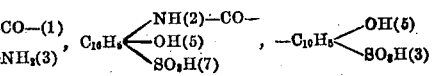

or

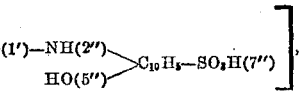

which constitute, in a dry state, brown powders, dissolve in dilute acids with red to violet colorations, in dilute alkalis with claret-red to blue-violet colorations and in concentrated sulfuric acid with red to violet colorations, dye unmordanted cotton direct tints sensitive to alkalis and to acids and produce by their treatment with coppering agents on the fiber copper compounds of claret-red to blue-violet pure tints fast to alkalis and to acids and extraordinarily fast to light.

2. As a new article of manufacture the herein described substantive orthooxyazo-dyestuff derived from 2 molecules of the diazoderivative of 2-amino-1-oxybenzene-4-sulfonamid and 1 molecule of 5:5'-dioxy-2:2'-dinaphthylamin-7:7'-disulfonic acid, which constitutes in a dry state a reddish-brown powder, dissolves in dilute alkalis to blue-violet solutions, in dilute acids and in concentrated sulfuric acid to violet solutions and dyes unmordanted cotton direct tints sensitive to alkalis and to acids, turning on subsequent coppering to a clear violet fast to alkalis and acids and extraordinarily fast to light.

In witness whereof we have hereunto signed our names this 15th day of May, 1917, in the presence of two subscribing witnesses.

EUGEN ANDERWERT.
HERMANN FRITZSCHE.

Witnesses:
H. H. DIRK,
AMAND BRAUN.